United States Patent [19]
Stone, Jr.

[11] 3,736,692
[45] June 5, 1973

[54] MOLE EXTERMINATOR
[76] Inventor: James M. Stone, Jr., Nacogdoches, Tex.
[22] Filed: Oct. 29, 1971
[21] Appl. No.: 193,772

[52] U.S. Cl. ................................................43/77
[51] Int. Cl. ............................................A01m 23/30
[58] Field of Search.................43/77, 58, 80, 64, 43/1, 124

[56] References Cited
UNITED STATES PATENTS

| 1,932,237 | 10/1933 | Warner | 43/124 |
| 2,725,662 | 12/1955 | Gorjup | 43/124 |
| 1,717,279 | 6/1929 | Terry | 43/1 |
| 2,534,699 | 12/1950 | Courter | 43/80 |

FOREIGN PATENTS OR APPLICATIONS
526,751   3/1954   Belgium ..............................43/77

Primary Examiner—Louis G. Mancene
Attorney—Hyman Berman, Stanford W. Berman, Theodore Bisoff

[57] ABSTRACT

A mole exterminator including a ground piercing rod adapted to be forced into the ground intersecting a mole run. A recess in the rod is provided for holding a razor blae secured thereto by a machine screw. The razor blade is arranged with its cutting edges parallel to the axis of the rod and the rod is forced into the ground to a depth which will position the razor blade centrally of the mole run. The mole, upon contacting the razor blade, will become lacerated and will bleed to death.

4 Claims, 3 Drawing Figures

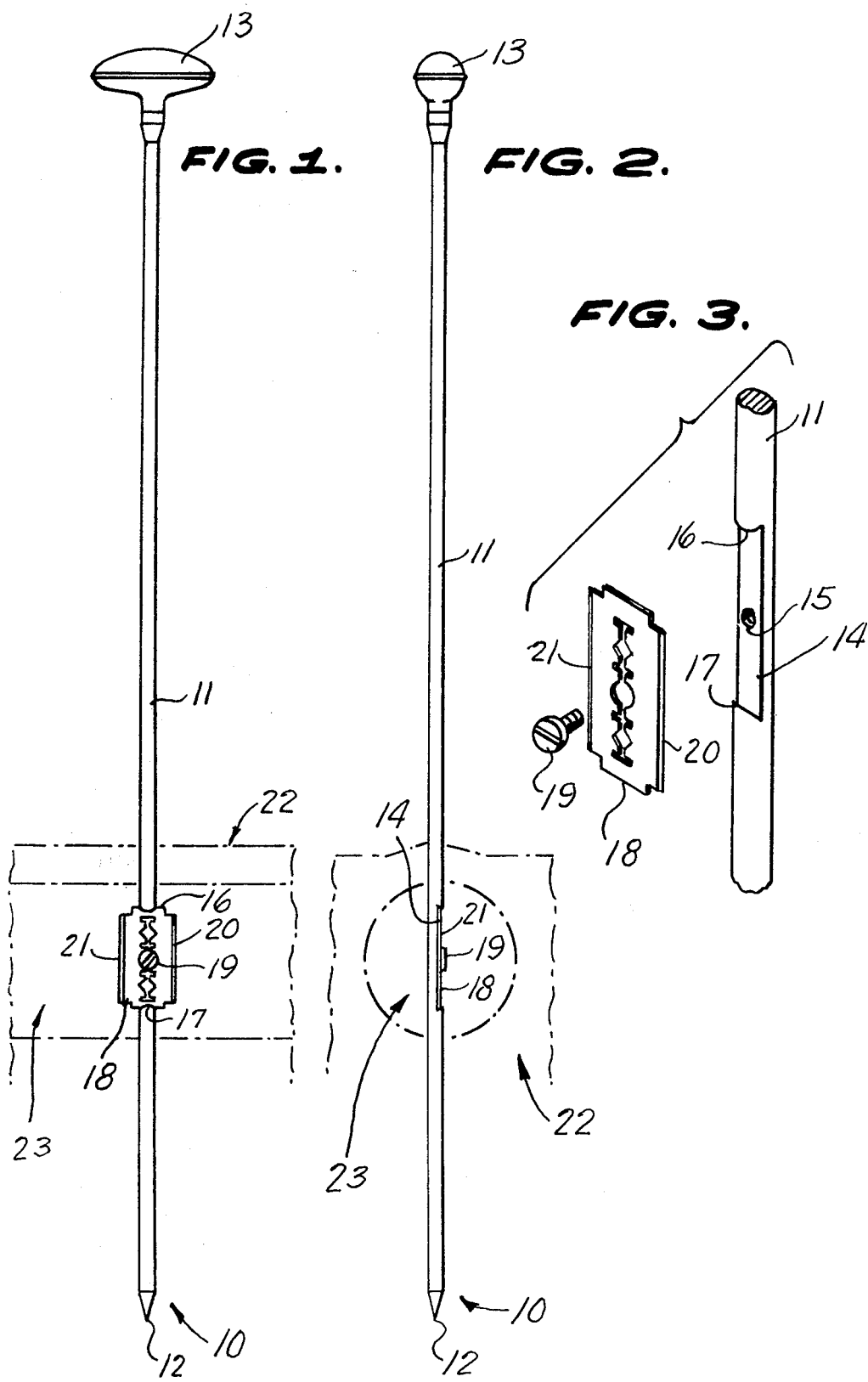

3,736,692

MOLE EXTERMINATOR

BACKGROUND OF THE INVENTION

1. Field of the Invention

The present invention relates to mole exterminators for causing the mole to bleed to death.

2. Description of the Prior Art

Prior art mole exterminators consist chiefly of devices which are forced into the ground and which are presumed to be triggered by the mole passing thereunder to release a battery of spikes which penetrate the ground and hopefully the mole's body. Devices of this kind are illustrated in U.S. Pat. Nos. 1,194,239, issued Aug. 8, 1916; 2,086,826, issued July 13, 1937; 2,385,875, issued Oct. 2, 1945; and 3,013,358, issued Dec. 19, 1961. The mole, thriving in most regions of the United States, is a pest. He destroys plants and crops by eating the seeds before they come up and by eating the roots of young vegetation. A large number of moles in the yard, garden or pasture can create a barren land.

The mole, unlike his closest cousin the gopher, is a very intelligent animal, and cannot be successfully poisoned by poison seeds or grain or trapped in any traps now on the market. There is a successful gopher trap, being a push-in type of trap that fits into the gopher run and when the gopher finds the trap in his run, he pushes against a plunger, which releases prongs that stick into the gopher, but this trap works very poorly, if at all, on moles. The mole, when he finds a trap in his run, simply digs around it. The mole trap commonly on the market is one which fits on top of the surface of the ground and when the mole goes through his run, he pushes against a plunger that sets on top of the ground, releasing an array of ice pick type prongs which plunge into the ground to stick into the mole, hopefully. This type of trap is expensive and works only on very few occasions since the mole, when it feels the pressure against its back, reverses itself, and simply goes around the trap.

SUMMARY OF THE INVENTION

A sharpened rod is provided with a knob on its upper end and has a recss intermediate its upper and lower ends to receive a safety razor blade. The blade is secured to the rod by a cap screw which is threaded into a threaded bore in the rod.

The rod is inserted in the ground through a mole run to a point where the razor blade is centrally positioned in the mole run to contact the nose of the mole as it moves forward in the run. The nose being cut the mole then bleeds to death.

The primary object of the invention is to provide a mole exterminator which lacerates the mole to cause it to bleed to death.

Other objects and advantages will become apparent from the following specification and considered in the light of the attached drawings.

BRIEF DESCRIPTION OF THE DRAWINGS

FIG. 1 is a side elevation of the invention;

FIG. 2 is a front view of the invention; and

FIG. 3 is a fragmentary exploded perspective illustrating the connection of the razor blade to the rod.

DESCRIPTION OF THE PREFERRED EMBODIMENT

Referring now to the drawings in detail wherein like reference characters indicate like parts throughout the several figures, the reference numeral 10 indicates generally a mole exterminator constructed in accordance with the invention.

The mole exterminator 10 includes an elongate metallic rod 11 sharpened to a point 12 at its lower end.

The rod 11 has a knob-type handle 13 secured to its upper end for pressing the rod 11 into the ground, for pulling it out of the ground and as an indicator for the rod to increase its visibility to thus prevent persons from tripping thereover.

An elongate recess 14 is formed in the rod 11 parallel to the axis thereof. A threaded bore 15 opens centrally of the recess 14 and extends completely through the rod 11. The end walls of the recess 14 taper inwardly to form a pair of overhanging lips 16, 17, as can be seen clearly in FIG. 3. A conventional double-edged razor blade 18 is positioned in the recess 14 with its upper and lower ends engaged by the overhanging lips 16, 17. A cap screw 19 extends through the razor blade 18 into the threaded bore 15 to secure the razor blade 18 rigidly to the rod 11. The cutting edges 20, 21 on the razor blade 18 are arranged parallel to the axis of the rod 11.

In the use and operation of the invention, the rod 11 is inserted into the ground generally indicated at 22, piercing a mole run generally indicated at 23. The rod is forced into the ground until the razor blade 18 is positioned within the mole run 23 with the edges 20, 21 of the razor blade 18 pointing axially of the mole run 23.

The blind mole in traveling the same mole run day after day will come in contact with the razor blade and lacerate his nose and will then bleed to death. It is important in using the mole exterminator that the mole run be undisturbed as much as possible and that the dirt above the mole run not be caved into the run near the exterminator.

Having thus described a preferred embodiment of the invention, it should be understood that numerous structural modifications and adaptations may be resorted to without departing from the spirit of the invention.

What is claimed is:

1. A mole exterminator comprising a ground piercing rod, a knob handle on the upper end of said rod, a double edged razor blade secured to said rod for positioning in a mole run to be contacted by the mole traveling therein, an elongate slot in one side of said rod with said razor blade engaged in said slot, and overhanging lips at the upper and lower ends of said slot for engaging the upper and lower ends of said razor blade.

2. A device as claimed in claim 1, wherein the cutting edges of the razor blade are arranged parallel to the axis of the rod.

3. A device as claimed in claim 1, wherein means are provided for releasably securing said razor blade in said slot.

4. A device as claimed in claim 3 wherein the means for releasably securing said blade in said slot comprises a bolt threaded into said rod intermediate the upper and lower ends of said slot with said bolt extending centrally through said razor blade.

\* \* \* \* \*